US009680789B2

(12) United States Patent
Murarka et al.

(10) Patent No.: US 9,680,789 B2
(45) Date of Patent: Jun. 13, 2017

(54) SOCIAL CONTEXT FOR APPLICATIONS

(71) Applicant: Facebook, Inc., Menlo Park, CA (US)

(72) Inventors: Neel Ishwar Murarka, Portola Valley, CA (US); Philip Fung, San Francisco, CA (US); Raghavendar Chandrasekaran, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/843,717

(22) Filed: Sep. 2, 2015

(65) Prior Publication Data
US 2015/0381554 A1 Dec. 31, 2015

Related U.S. Application Data

(63) Continuation of application No. 13/777,280, filed on Feb. 26, 2013, now Pat. No. 9,167,046.

(51) Int. Cl.
*G06F 15/16* (2006.01)
*G06F 17/30* (2006.01)
*H04L 12/58* (2006.01)
*H04L 29/08* (2006.01)
*G06Q 50/00* (2012.01)

(52) U.S. Cl.
CPC .......... *H04L 51/32* (2013.01); *G06F 17/3053* (2013.01); *G06Q 50/01* (2013.01); *H04L 67/22* (2013.01)

(58) Field of Classification Search
USPC ................................................ 709/204, 206
See application file for complete search history.

(56) References Cited

U.S. PATENT DOCUMENTS

| 8,306,908 | B1* | 11/2012 | Barker | G06Q 30/0224 |
| | | | | 705/14.26 |
| 8,417,698 | B2* | 4/2013 | Yoo | G06F 17/30867 |
| | | | | 707/732 |
| 9,167,046 | B2* | 10/2015 | Murarka | H04L 67/22 |
| 2009/0106040 | A1* | 4/2009 | Jones | G06Q 50/01 |
| | | | | 705/319 |
| 2009/0112837 | A1* | 4/2009 | Modani | G06F 17/30864 |
| 2009/0234876 | A1* | 9/2009 | Schigel | G06F 17/30873 |

(Continued)

OTHER PUBLICATIONS

Australian Patent Examination Report for AU Application No. 2014223834, Oct. 19, 2015.

(Continued)

*Primary Examiner* — Jude Jean Gilles
(74) *Attorney, Agent, or Firm* — Baker Botts L.L.P.

(57) ABSTRACT

In one embodiment, a method includes identifying one or more first users of the social-networking system that are connected to a second user within the social-networking system; inferring one or more applications of interest to the second user based at least in part on information associated with one or more applications installed on one or more client systems of the first users; generating one or more recommendations corresponding to one or more of the applications of interest to the second user; ranking the recommendations based on social-graph information of the second user relative to the one or more first users; and sending one or more of the ranked recommendations to one or more client devices of the second user.

17 Claims, 7 Drawing Sheets

(56) References Cited

U.S. PATENT DOCUMENTS

| | | | |
|---|---|---|---|
| 2010/0272414 A1* | 10/2010 | Reneris | H04N 21/4882 386/291 |
| 2011/0066507 A1* | 3/2011 | Iyer | G06Q 30/02 705/14.66 |
| 2012/0072283 A1 | 3/2012 | DeVore et al. | |
| 2012/0166177 A1* | 6/2012 | Beld | G06F 17/27 704/9 |
| 2012/0303652 A1 | 11/2012 | Tseng | |
| 2012/0316955 A1* | 12/2012 | Panguluri | G06Q 30/02 705/14.41 |
| 2013/0097246 A1* | 4/2013 | Zifroni | G06Q 50/01 709/204 |
| 2013/0204825 A1* | 8/2013 | Su | G06N 5/04 706/46 |
| 2014/0037076 A1* | 2/2014 | Bouzid | H04M 3/42204 379/88.03 |
| 2014/0150109 A1* | 5/2014 | Fire | G06F 21/6245 726/26 |
| 2014/0152666 A1* | 6/2014 | Deng | H04L 51/14 345/440 |
| 2014/0156547 A1* | 6/2014 | Winston | G06Q 10/10 705/317 |
| 2014/0188907 A1* | 7/2014 | Benchenaa | G06F 17/30994 707/752 |
| 2015/0220555 A1* | 8/2015 | Wang | G06F 17/30867 707/624 |

OTHER PUBLICATIONS

Notice of Acceptance received from the Australian IP Government for Australian Application No. 2014223834. May 4, 2016.

\* cited by examiner

SOCIAL CONTEXT FOR APPLICATIONS

PRIORITY

This application is a continuation under 35 U.S.C. §120 of U.S. patent application Ser. No. 13/777,280, filed 26 Feb. 2013.

TECHNICAL FIELD

This disclosure generally relates to mobile devices.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, information corresponding to the applications installed on a mobile device of a user may be transmitted to the social-networking system. The social-networking system may compare the applications installed on the mobile device of the user with applications installed on the mobile device of the user's friends. The social-networking system may provide recommendations for applications based on the number of friends that have previously installed the application. For example, when the user is browsing for mobile applications, the social-networking system may provide an indication of the number of friends of the user who have each installed in their mobile device, such as for example an additional badge showing the number of friends who installed the application. As another example, the social-networking system may provide a notification or open a tab showing the recommended applications to the user in response to the user browsing an application store. The recommendations may weighted by other social based context such as for example the number of times each friend uses the particular application or more heavily weighting recommendations of friends with higher interaction with the user. For example, a game application may have an additional badge indicating the number of friends currently playing the game application. As another example, if the user is viewing a webpage of an application, e.g. Angry Birds, a message can be displayed indicating to the user how many friends have the application installed on their mobile device.

DESCRIPTION OF EXAMPLE EMBODIMENTS

Figure 1:
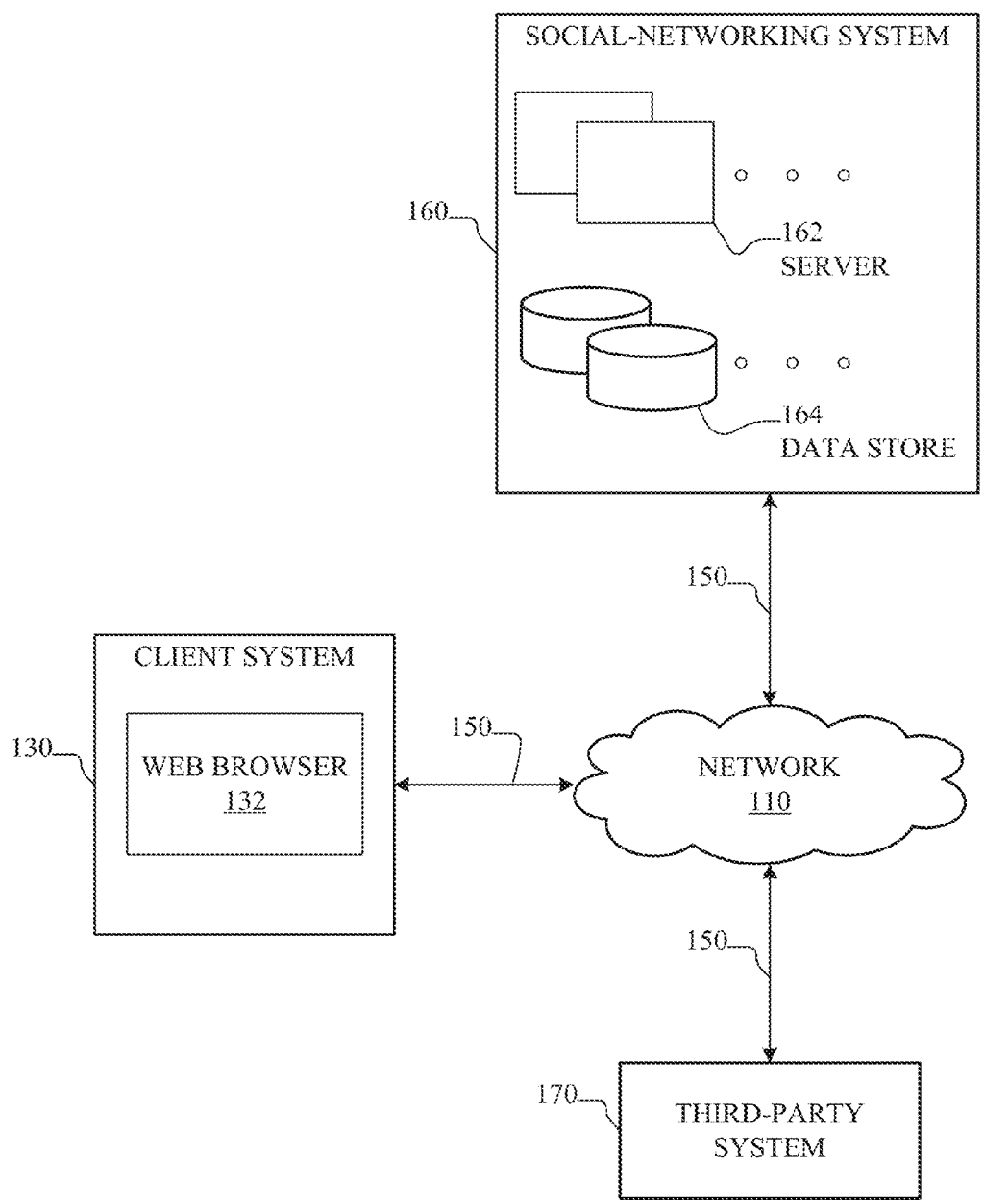
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g. relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, location store, or application store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. As an example and not by way of limitation, the web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g. third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

The application store may be a platform that is maintained by social-networking system 160 for distributing applications, such as for example, mobile applications. In particular embodiments, the application store of social-networking system 160 may be used to provide access to one or more applications or "apps" available for installation on client system 130 associated with user 101 and store information associated with one or more applications installed on client system 130. Social-networking system 160 may provide a recommendation for one or more applications of possible interest to user 101 based at least in part on applications installed by other users with a relationship to user 101. In particular embodiments, social-networking system 160 may receive information associated with the applications installed on client system 130, associate the information with user 101, and store the information in the application store. Although this disclosure describes inferring applications installed on client systems through a particular application store, this disclosure contemplates any suitable method of inferring the applications installed on client system 130, such as for example a trusted-platform module (TPM) that provides system-state information detailing the configuration of client system 130 and including data that indicates which applications are installed on client system.

In particular embodiments, social-networking system may access the information associated with the applications installed on client system 130 and compare the information with information associated with applications installed by other users with a relationship to user 101. The relationship may between users may be determined based at least in part on social-graph information. Based at least in part on the comparison of information associated with the applications installed by user 101 and other users, social-networking system 160 may provide recommendations of applications for user 101 to install on client system 130. In particular embodiments, social-networking system 160 may send a notification to user 101 or open a web-browser window or tab on client system 130 showing the recommended applications in response to detecting user 101 is browsing the application store. In particular embodiments, social-networking system 160 may rank the application recommendations based at least in part on social-graph information associated with user 101. In particular embodiments, the application recommendations may weighed using other social based context, such as for example, the number of times each friend of user 101 uses the particular application or more heavily weighing recommendations of friends with higher interaction with the user. In particular embodiments, social-networking system 160 may send one or more application recommendations associated with one or more applications installed on client system 130. As an example and not by not way of limitation, social-networking system 160 may provide an indication to user 101 of a number of other users with a relationship to user 101 who have also installed a particular application that is installed on a client system 130 associated with user 101, as described below.

Figure 2:
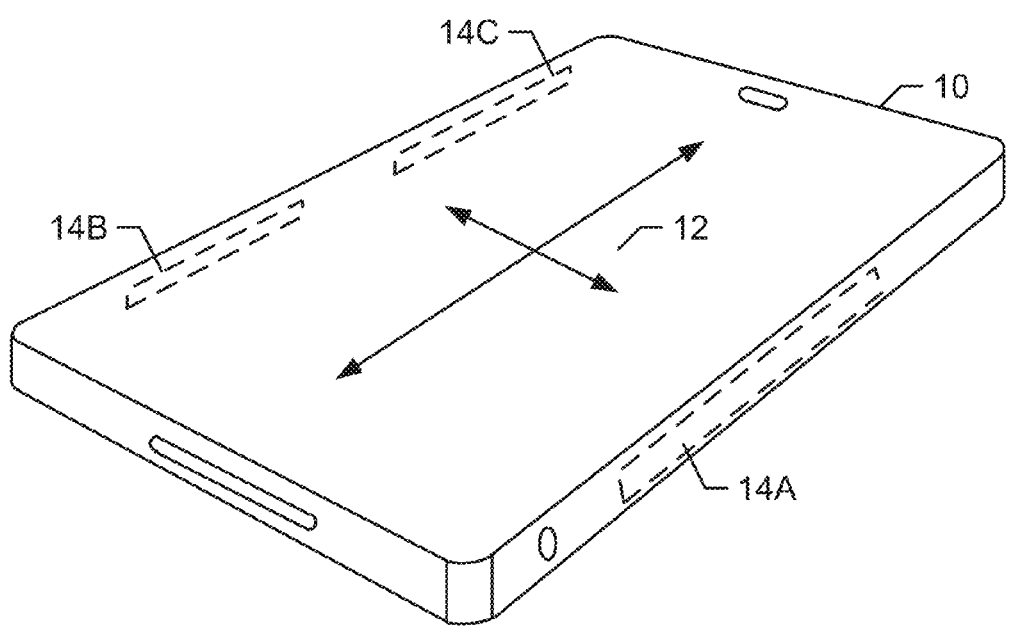
FIG. 2 illustrates an example mobile device.

FIG. 2 illustrates an example mobile computing device. In particular embodiments, the client system may be a mobile computing device 10 as described above. This disclosure contemplates mobile computing device 10 taking any suitable physical form. In particular embodiments, mobile computing device 10 may be a computing system as described below. As example and not by way of limitation, mobile computing device 10 may be a single-board computer system (SBC) (such as, for example, a computer-on-module (COM) or system-on-module (SOM)), a laptop or notebook computer system, a mobile telephone, a smartphone, a personal digital assistant (PDA), a tablet computer system, or a combination of two or more of these. In particular embodiments, mobile computing device 10 may have a touch sensor 12 as an input component. In the example of FIG. 2, touch sensor 12 is incorporated on a front surface of mobile computing device 10. In the case of capacitive touch sensors, there may be two types of electrodes: transmitting and receiving. These electrodes may be connected to a controller designed to drive the transmitting electrodes with electrical pulses and measure the changes in capacitance from the receiving electrodes caused by a touch or proximity input. In the example of FIG. 2, one or more antennae 14A-B may be incorporated into one or more sides of mobile computing device 10. Antennae 14A-B are components that convert electric current into radio waves, and vice versa. During transmission of signals, a transmitter applies an oscillating radio frequency (RF) electric current to terminals of antenna 14A-B, and antenna 14A-B radiates the energy of the applied the current as electromagnetic (EM) waves. During reception of signals, antennae 14A-B convert the power of an incoming EM wave into a voltage at the terminals of antennae 14A-B. The voltage may be transmitted to a receiver for amplification.

Mobile computing device 10 many include a communication component coupled to antennae 14A-B for communicating with an Ethernet or other wire-based network or a wireless NIC (WNIC), wireless adapter for communicating with a wireless network, such as for example a WI-FI network or modem for communicating with a cellular network, such third generation mobile telecommunications (3G), or Long Term Evolution (LTE) network. This disclosure contemplates any suitable network and any suitable communication component 20 for it. As an example and not by way of limitation, mobile computing device 10 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, mobile computing device 10 may communicate with a wireless PAN (WPAN) (such as, for example, a BLUETOOTH WPAN), a WI-FI network, a WI-MAX network, a cellular telephone network (such as, for example, a Global System for Mobile Communications (GSM), 3G, or LTE network), or other suitable wireless network or a combination of two or more of these. Mobile computing device 10 may include any suitable communication component for any of these networks, where appropriate.

In particular embodiments, one or more application recommendations may be provided to the user though mobile computing device 10, as described below. Although this disclosure illustrates and describes a particular type of computing device, this disclosure contemplates sending application recommendations to any suitable type of computing device, such as for example, a personal computer, tablet computer, connected television, or smartphone. In particular embodiments, the application recommendations may be provided for display on mobile computing device 10 in response to a user accessing the application store of the social-networking system through mobile computing device 10. As an example and not by way of limitation, the application recommendations may be dynamically aggregated as a newsfeed provided for display on mobile computing device 10, as described below. As described above, a recommendation of web-based applications of possible interest to the user associated with mobile computing device 10 may be provided for display on mobile computing device 10.

Figure 3:
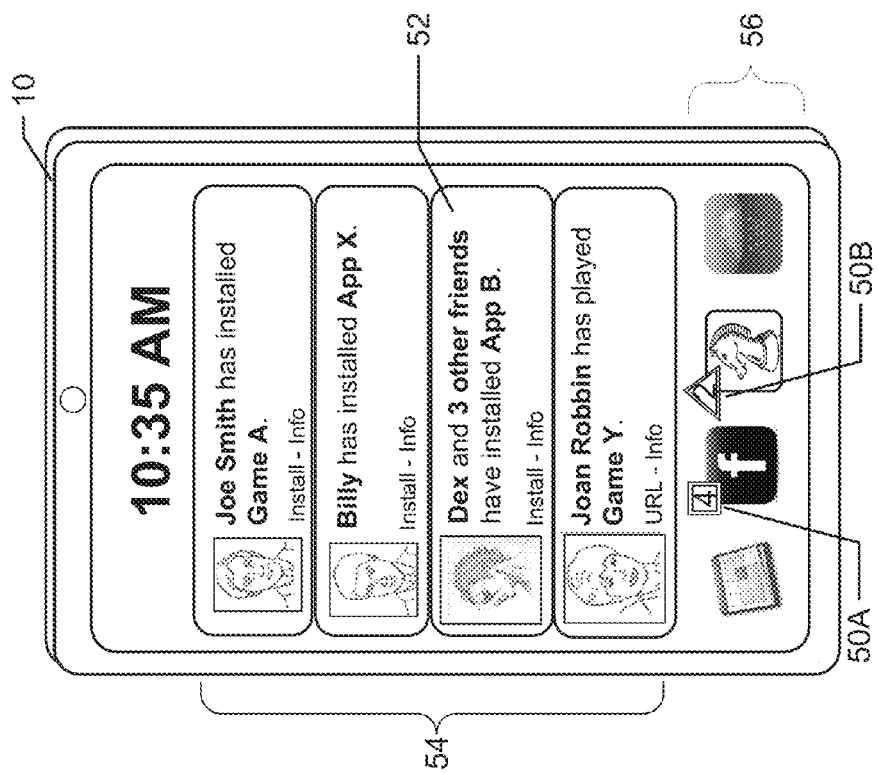
FIG. 3 illustrates an example wireframe with example socialized-application recommendations.

FIG. 3 illustrates an example wireframe with example socialized-application recommendations. As described above, one or more application recommendations 52 may be dynamically aggregated as an application recommendation newsfeed 54 that may be provided for display on mobile computing device 10. In particular embodiments, the application recommendations 52 may include information of actions by other users with a relationship to the user of mobile computing device 10, such as for example installing a particular application. As an example and not by way of limitation, information that one or more users with a relationship to the user have installed a particular application may be periodically pushed (i.e. sent to mobile computing device 10 without input from mobile computing device 10) by, for example, a server of the social-networking system, to mobile computing device 10 in response to the user browsing an application store. Alternatively or in addition, mobile computing device 10 may pull (i.e. sent to mobile computing device 10) application recommendations 52 to mobile computing device 10.

In particular embodiments, a notification that includes information identifying one or more other users or a number of users that have installed a particular application may be provided for display in response to the user accessing a webpage associated with the particular application. As an example and not by way of limitation, a modal window that includes information associated with a number of friends who have installed a game application, such as for example ANGRY BIRDS, may be provided for display on mobile computing device 10 in response to the user accessing the ANGRY BIRDS website through mobile computing device 10. In particular embodiments, application recommendations 52 of application recommendation newsfeed 54 may include a link to initiate installation of the recommended application on mobile computing device 10 or launch a webpage with additional information of the application. Although this disclosure illustrates and describes a particular application recommendation newsfeed that includes particular application recommendations, this disclosure contemplates any suitable presentation of any suitable application recommendations, such as for example display of an application recommendation in a modal window or an advertisement by a third-party content provider.

In particular embodiments, particular pages, such as for example an application launcher, of mobile computing device 10 may include one or more interactive elements 56, such as for example icons, to initiate execution of an associated application, as illustrated in the example of FIG. 3. As an example and not by way of limitation, interactive elements 56 may each correspond to an application installed on or a function of mobile computing device 10. As an example and not by way of limitation, an application or function of mobile computing device 10 may be executed or "launched" in response to detecting a pre-determined touch gesture performed in conjunction with one or more interactive elements 56, such as for example, tapping an icon 56. As described above, mobile computing device 10 may receive information associated with a number of other users, with a relationship to the user, who have installed the particular application. In particular embodiments, an indicator 50A-B of the number of users who have installed or used a particular application, such as for example a badge, may be displayed in conjunction with interactive element 56 associated with the particular application installed on mobile computing device 10 of the user. As an example and not by way of limitation, a badge 50A may display a number of friends who have installed a particular social-networking application may be displayed along with interactive element 56 associated with the particular social-networking application installed on mobile computing device 10. As another example, a badge 50B may display a number of friends who have played a particular game application over pre-determined period of time and badge 50B may be displayed along with interactive element 56 associated with the particular gaming application installed on mobile computing device 10. Although this disclosure illustrates and describes particular interactive elements with particular indicators that correspond to particular applications or functionality, this disclosure contemplates any suitable interactive elements with any suitable indicators associated with any suitable applications or functionality.

Figure 4:
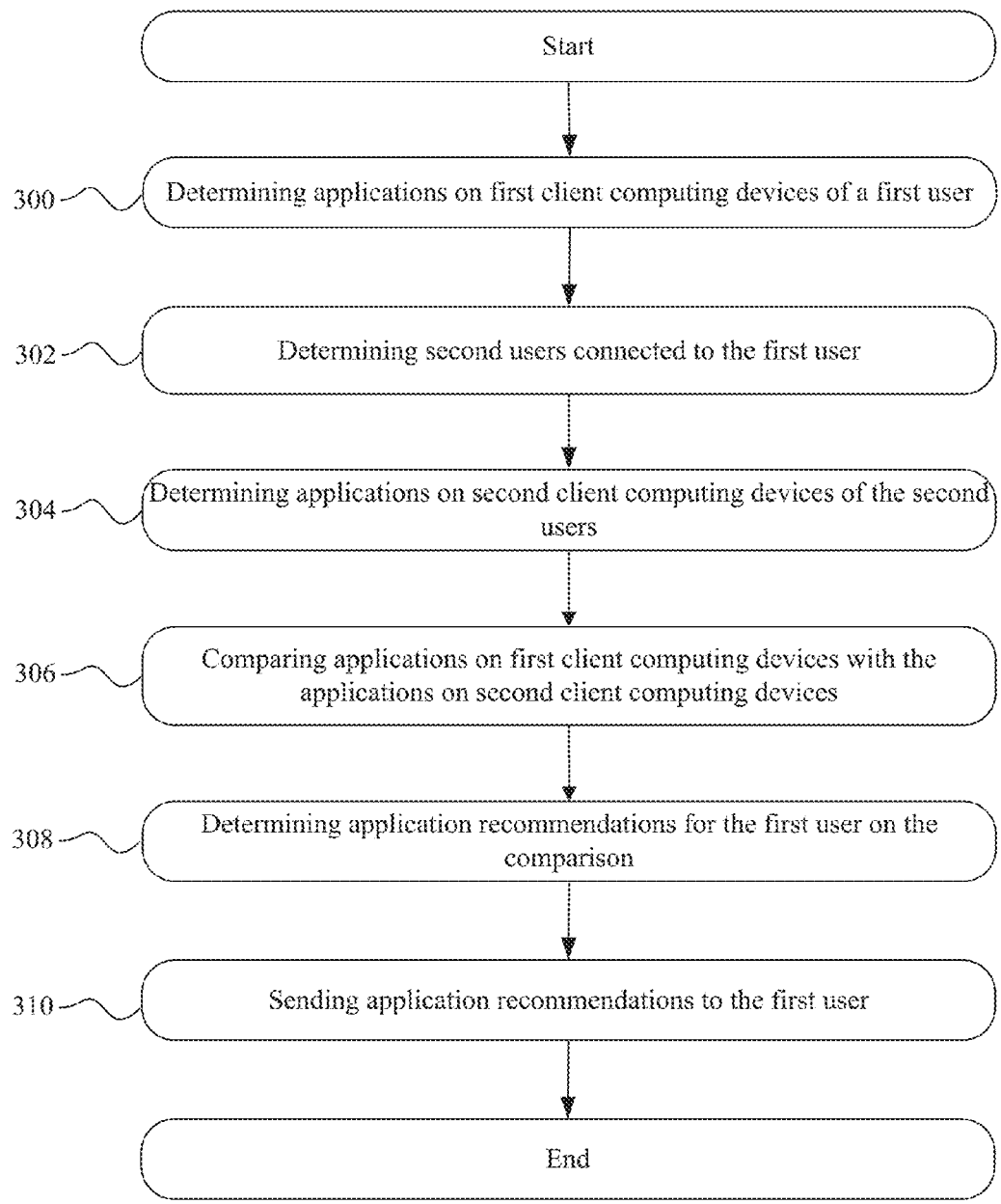
FIG. 4 illustrates an example method for socializing application recommendations.

FIG. 4 illustrates an example method for socializing application recommendations. The method may start at step 300, where a server computing device determines one or more applications installed on one or more first client computing devices of a first user of a social-networking system. Step 302 determines, by a server computing device, one or more second users of the social-networking system that are connected to the first user within the social-networking system. Step 304 determines, by a server computing device, one or more applications installed on one or more second client computing devices of the second users. At step 306, a server computing device compares the applications on the first client computing devices with the applications installed on the second client computing devices. Step 308 determines, by a server computing device, one or more application recommendations for the first user based at least in part on the comparison. At step 310, a server computing device sends the application recommendations to the first user, at which point the method may end. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates particular components carrying out particular steps of the method of FIG. 4, this disclosure contemplates any suitable combination of any suitable components carrying out any suitable steps of the method of FIG. 4.

Figure 5:
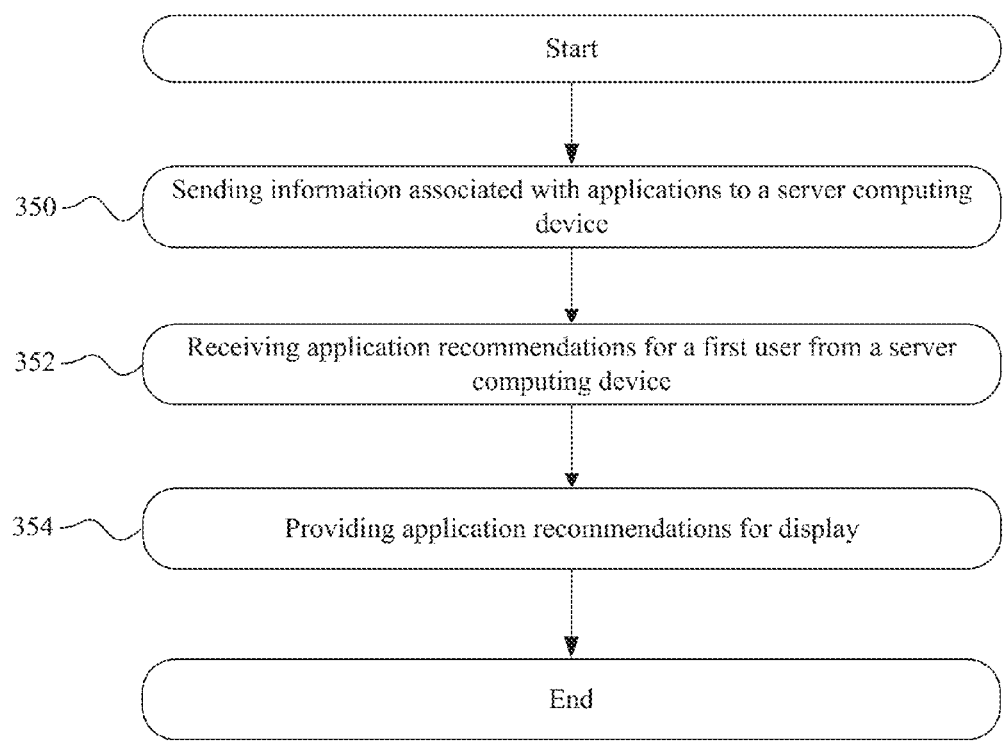
FIG. 5 illustrates an example method for receiving socialized-application recommendations.

FIG. 5 illustrates an example method for receiving socialized-application recommendations. The method may start at step 350, where a first client computing device, sends information associated with one or more applications on a first client computing device to one or more server computing devices of a social-networking system. In particular embodiments, the applications are on one or more first client computing devices of a first user of the social-networking system. Step 352 receives, by a first client computing device, one or more application recommendations for the first user from a server computing device. In particular embodiments, the application recommendations are determined based at least in part on a comparison of the applications on the first client computing devices with one or more applications on a second client computing device of one or more second users. Moreover, the second users are connected to the first user within the social-networking system. At step 354, a first client device provides the application recommendations for display, at which point the method may end. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates particular components carrying out particular steps of the method of FIG. 5, this disclosure contemplates any suitable combination of any suitable components carrying out any suitable steps of the method of FIG. 5.

Figure 6:
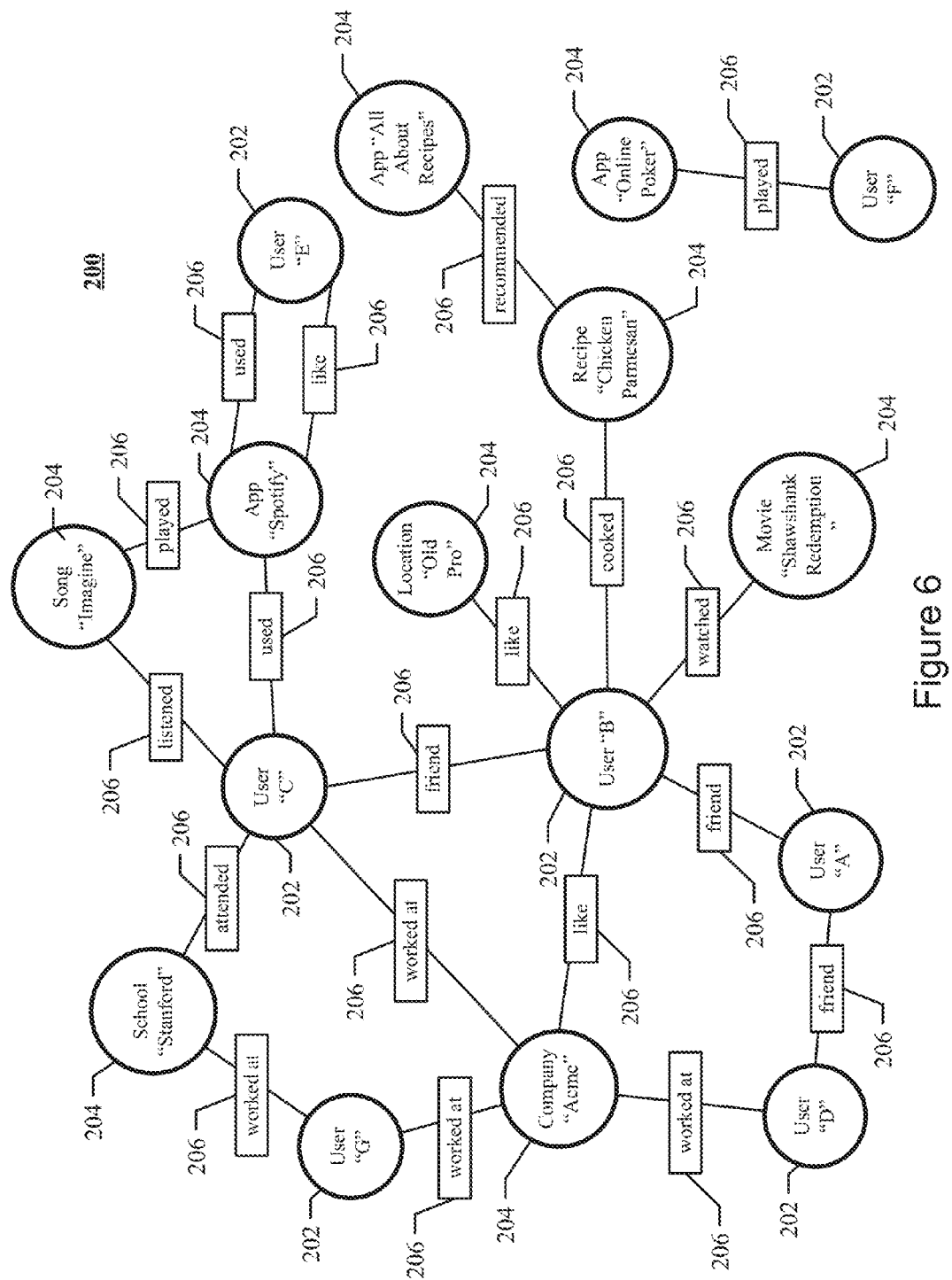
FIG. 6 illustrates an example social graph.

FIG. 6 illustrates an example social graph. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 6 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g. an enterprise, business, or third-party application), or a group (e.g. of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g. an image of the cover page of a book); a location (e.g. an address or a geographical location); a website (which may be associated with a URL); contact information (e.g. a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g. "eat"), causing a client system 130 to transmit to social-networking system 160 a message indicating the user's action. In response to the message, social-networking system 160 may create an edge (e.g. an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. Moreover, the first user may provide this indication through the interactive elements of the socialized dash of the client system of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 24. In the example of FIG. 6, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

As described above, application recommendations may be ranked by the social-networking system based at least in part on social-graph information associated with a particular user. In particular embodiments, application recommendations may be ranked based at least in part on the proximity of other user nodes 202 connected by edge 206 to user node 202 associated with the particular user. As an example and not by way of limitation, an application recommendation associated with user node 202 that is directly connected to a user node 202 associated with the particular user may be ranked higher than an application recommendation associated with a user node 202 connected to user node 202 of the particular user through a user node 202 associated with a third user. As illustrated by the example of FIG. 6, an application recommendation for user "B" from user "A" may be ranked higher than an application recommendation from user "C".

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 6, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "like" icon. As another example, the socialized dash of a client system may include a selectable "check in" icon (such as, for example, a clickable "check in" icon) or a selectable "like" icon. Similarly, after a user clicks these icons, social-networking system 160 may create a "like" edge or a "check in" edge in response to a user's action corresponding to a respective action. As another example and not by way of limitation, a user (e.g. user "C") may listen to a particular song (e.g. "Ramble On") using a particular application (e.g. SPOTIFY, which is an online music application). In this case, social-networking system 160 may create a "listened" edge 206 and a "used" edge (as illustrated in FIG. 6) between user nodes 202 corresponding to the user and concept nodes 204 corresponding to the song and application to indicate that the user listened to the song and used the application. Moreover, social-networking system 160 may create a "played" edge 206 (as illustrated in FIG. 6) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 6 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

Figure 7:
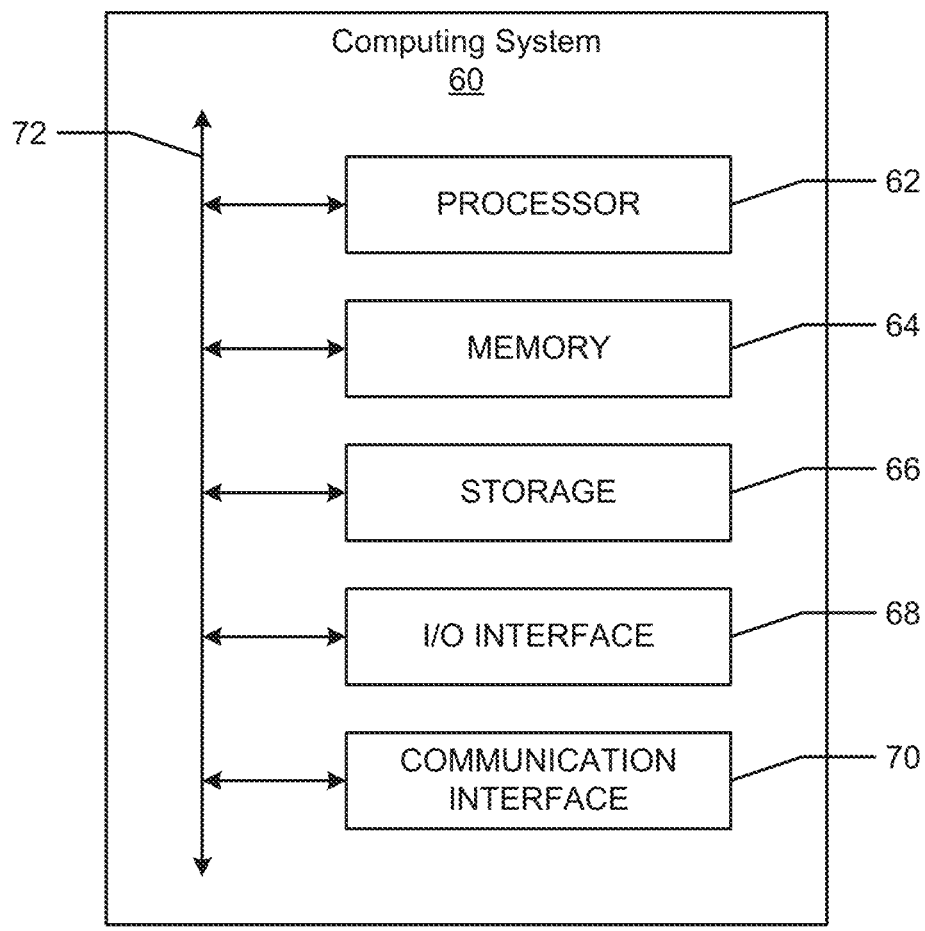
FIG. 7 illustrates an example computing system.

FIG. 7 illustrates example computing system. In particular embodiments, one or more computer systems 60 perform one or more steps of one or more methods described or illustrated herein. In particular embodiments, one or more computer systems 60 provide functionality described or illustrated herein. In particular embodiments, software running on one or more computer systems 60 performs one or more steps of one or more methods described or illustrated herein or provides functionality described or illustrated herein. Particular embodiments include one or more portions of one or more computer systems 60. Herein, reference to a computer system may encompass a computing device, where appropriate. Moreover, reference to a computer system may encompass one or more computer systems, where appropriate.

This disclosure contemplates any suitable number of computer systems 60. This disclosure contemplates computer system 60 taking any suitable physical form. As example and not by way of limitation, computer system 60 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a tablet computer system, or a combination of two or more of these. Where appropriate, computer system 60 may include one or more computer systems 60; be unitary or distributed; span multiple locations; span multiple machines; span multiple data centers; or reside in a cloud, which may include one or more cloud components in one or more networks. Where appropriate, one or more computer systems 60 may perform without substantial spatial or temporal limitation one or more steps of one or more methods described or illustrated herein. As an example and not by way of limitation, one or more computer systems 60 may perform in real time or in batch mode one or more steps of one or more methods described or illustrated herein. One or more computer systems 60 may perform at different times or at different locations one or more steps of one or more methods described or illustrated herein, where appropriate.

In particular embodiments, computer system 60 includes a processor 62, memory 64, storage 66, an input/output (I/O) interface 68, a communication interface 70, and a bus 72. Although this disclosure describes and illustrates a particular computer system having a particular number of particular components in a particular arrangement, this disclosure contemplates any suitable computer system having any suitable number of any suitable components in any suitable arrangement.

In particular embodiments, processor 62 includes hardware for executing instructions, such as those making up a computer program. As an example and not by way of limitation, to execute instructions, processor 62 may retrieve (or fetch) the instructions from an internal register, an internal cache, memory 64, or storage 66; decode and execute them; and then write one or more results to an internal register, an internal cache, memory 64, or storage 66. In particular embodiments, processor 62 may include one or more internal caches for data, instructions, or addresses. This disclosure contemplates processor 62 including any suitable number of any suitable internal caches, where appropriate. As an example and not by way of limitation, processor 62 may include one or more instruction caches, one or more data caches, and one or more translation lookaside buffers (TLBs). Instructions in the instruction caches may be copies of instructions in memory 64 or storage 66, and the instruction caches may speed up retrieval of those instructions by processor 62. Data in the data caches may be copies of data in memory 64 or storage 66 for instructions executing at processor 62 to operate on; the results of previous instructions executed at processor 62 for access by subsequent instructions executing at processor 62 or for writing to memory 64 or storage 66; or other suitable data. The data caches may speed up read or write operations by processor 62. The TLBs may speed up virtual-address translation for processor 62. In particular embodiments, processor 62 may include one or more internal registers for data, instructions, or addresses. This disclosure contemplates processor 62 including any suitable number of any suitable internal registers, where appropriate. Where appropriate, processor 62 may include one or more arithmetic logic units (ALUs); be a multi-core processor; or include one or more processors 62. Although this disclosure describes and illustrates a particular processor, this disclosure contemplates any suitable processor.

In particular embodiments, memory 64 includes main memory for storing instructions for processor 62 to execute or data for processor 62 to operate on. As an example and not by way of limitation, computer system 60 may load instructions from storage 66 or another source (such as, for example, another computer system 60) to memory 64. Processor 62 may then load the instructions from memory 64 to an internal register or internal cache. To execute the instructions, processor 62 may retrieve the instructions from the internal register or internal cache and decode them. During or after execution of the instructions, processor 62 may write one or more results (which may be intermediate or final results) to the internal register or internal cache. Processor 62 may then write one or more of those results to memory 64. In particular embodiments, processor 62 executes only instructions in one or more internal registers or internal caches or in memory 64 (as opposed to storage 66 or elsewhere) and operates only on data in one or more internal registers or internal caches or in memory 64 (as opposed to storage 66 or elsewhere). One or more memory buses (which may each include an address bus and a data bus) may couple processor 62 to memory 64. Bus 72 may include one or more memory buses, as described below. In particular embodiments, one or more memory management units (MMUs) reside between processor 62 and memory 64 and facilitate accesses to memory 64 requested by processor 62. In particular embodiments, memory 64 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 64 may include one or more memories 64, where appropriate. Although this disclosure describes and illustrates particular memory, this disclosure contemplates any suitable memory.

In particular embodiments, storage 66 includes mass storage for data or instructions. As an example and not by way of limitation, storage 66 may include a hard disk drive (HDD), a floppy disk drive, flash memory, an optical disc, a magneto-optical disc, magnetic tape, or a Universal Serial Bus (USB) drive or a combination of two or more of these. Storage 66 may include removable or non-removable (or fixed) media, where appropriate. Storage 66 may be internal or external to computer system 60, where appropriate. In particular embodiments, storage 66 is non-volatile, solid-state memory. In particular embodiments, storage 66 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 66 taking any suitable physical form. Storage 66 may include one or more storage control units facilitating communication between processor 62 and storage 66, where appropriate. Where appropriate, storage 66 may include one or more storages 66. Although this disclosure describes and illustrates particular storage, this disclosure contemplates any suitable storage.

In particular embodiments, I/O interface 68 includes hardware, software, or both providing one or more interfaces for communication between computer system 60 and one or more I/O devices. Computer system 60 may include one or more of these I/O devices, where appropriate. One or more of these I/O devices may enable communication between a person and computer system 60. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 68 for them. Where appropriate, I/O interface 68 may include one or more device or software drivers enabling processor 62 to drive one or more of these I/O devices. I/O interface 68 may include one or more I/O interfaces 68, where appropriate. Although this disclosure describes and illustrates a particular I/O interface, this disclosure contemplates any suitable I/O interface.

In particular embodiments, communication interface 70 includes hardware, software, or both providing one or more interfaces for communication (such as for example, packet-based communication) between computer system 60 and one or more other computer systems 60 or one or more networks. As an example and not by way of limitation, communication interface 70 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 70 for it. As an example and not by way of limitation, computer system 60 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 60 may communicate with a wireless PAN (WPAN) (such as for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 60 may include any suitable communication interface 70 for any of these networks, where appropriate. Communication interface 70 may include one or more communication interfaces 70, where appropriate. Although this disclosure describes and illustrates a particular communication interface, this disclosure contemplates any suitable communication interface.

In particular embodiments, bus 72 includes hardware, software, or both coupling components of computer system 60 to each other. As an example and not by way of limitation, bus 72 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 72 may include one or more buses 72, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives (MODDs), floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
    by a computing device, identifying one or more first users of the social-networking system that are connected to a second user within the social-networking system;
    by the computing device, inferring one or more applications of interest to the second user based at least in part on information associated with one or more applications installed on one or more client devices of the first users;
    by the computing device, generating one or more recommendations corresponding to one or more of the applications of interest to the second user;
    by the computing device, ranking the recommendations based on social-graph information of the second user relative to the one or more first users, wherein at least one of the recommendations is more heavily weighted based on a number of uses of the application corresponding to that recommendation over a pre-determined period of time by one or more of the first users; and
    by the computing device, sending one or more of the ranked recommendations to one or more client devices of the second user.

2. The method of claim 1, wherein:
    the social-networking system comprises a graph that comprises a plurality of nodes and edges connecting the nodes;
    for each of the first users at least one node in the graph corresponding to the first user;

at least one node in the graph corresponding to the second user; and at least one of the nodes corresponding to one of the first users and at least one of the nodes corresponding to the second user being connected to each other by one or more edges.

3. The method of claim 2, wherein the social-graph information comprises a proximity of one or more of the nodes corresponding relative to the first users to the node corresponding to the second user.

4. The method of claim 1, wherein the sending of the ranked recommendations is in response to detecting the second user is interacting with a platform configured to distribute applications.

5. The method of claim 4, wherein the social-graph information comprises information of installation activity of the first users on the platform.

6. The method of claim 1, wherein one or more of the ranked recommendations comprises identifying information corresponding to one or more of the first users.

7. The method of claim 1, wherein one or more of the application recommendations comprise an indication of a number of the first users that have installed one or more of the applications of interest.

8. The method of claim 1, wherein one or more of the application recommendations comprise an interactive element corresponding to a particular application of interest and a badge indicating a number of the first users that have used the particular application of interest.

9. The method of claim 1, wherein the inferring of the one or more applications of interest to the second user is based at least in part on determining one or more applications on the client device of the first users that are not installed on the client device of the second user.

10. The method of claim 1, wherein the ranked recommendations are dynamically aggregated as a newsfeed.

11. The method of claim 1, wherein the ranked recommendations are periodically updated.

12. One or more computer-readable non-transitory storage media embodying software configured when executed to:

identify one or more first users of the social-networking system that are connected to a second user within the social-networking system;

infer one or more applications of interest to the second user based at least in part on information associated with one or more applications installed on one or more client devices of the first users;

generate one or more recommendations corresponding to one or more of the applications of interest to the second user;

rank the recommendations based on social-graph information of the second user relative to the one or more first users, wherein at least one of the recommendations is more heavily weighted based on a number of uses of the application corresponding to that recommendation over a pre-determined period of time by one or more of the first users; and send one or more of the ranked recommendations to one or more client devices of the second user.

13. The media of claim 12, wherein:

the social-networking system comprises a graph that comprises a plurality of nodes and edges connecting the nodes;

for each of the first users at least one node in the graph corresponding to the first user;

at least one node in the graph corresponding to the second user; and at least one of the nodes corresponding to one of the first users and at least one of the nodes corresponding to the second user being connected to each other by one or more edges.

14. The media of claim 13, wherein the social-graph information comprises a proximity of one or more of the nodes corresponding to the first users relative to the node corresponding to the second user.

15. A device comprising:

one or more processors; and one or more computer-readable non-transitory storage media coupled to the processors and embodying software configured when executed to:

identify one or more first users of the social-networking system that are connected to a second user within the social-networking system;

infer one or more applications of interest to the second user based at least in part on information associated with one or more applications installed on one or more client systems of the first users;

generate one or more recommendations corresponding to one or more of the applications of interest to the second user;

rank the recommendations based on social-graph information of the second user relative to the one or more first users, wherein at least one of the recommendations is more heavily weighted based on a number of uses of the application corresponding to that recommendation over a pre-determined period of time by one or more of the first users; and send one or more of the ranked recommendations to one or more client devices of the second user.

16. The device of claim 15, wherein:

the social-networking system comprises a graph that comprises a plurality of nodes and edges connecting the nodes;

for each of the first users at least one node in the graph corresponding to the first user;

at least one node in the graph corresponding to the second user; and at least one of the nodes corresponding to one of the first users and at least one of the nodes corresponding to the second user being connected to each other by one or more edges.

17. The device of claim 16, wherein the social-graph information comprises a proximity of one or more of the nodes corresponding to the first users relative to the node corresponding to the second user.

* * * * *